US010436139B2

(12) United States Patent
Chen et al.

(10) Patent No.: US 10,436,139 B2
(45) Date of Patent: Oct. 8, 2019

(54) ALARM SYSTEM AND ALARM METHOD

(71) Applicant: INSTITUTE FOR INFORMATION INDUSTRY, Taipei (TW)

(72) Inventors: Shi-Huang Chen, Koahsiung (TW); Jui-Yang Tsai, New Taipei (TW); Wen-Kai Liu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 377 days.

(21) Appl. No.: 15/426,018

(22) Filed: Feb. 6, 2017

(65) Prior Publication Data
US 2018/0156150 A1    Jun. 7, 2018

(30) Foreign Application Priority Data

Dec. 2, 2016 (CN) .......................... 2016 1 1095196

(51) Int. Cl.
  *F02D 41/22* (2006.01)
  *G07C 5/00* (2006.01)
  *G07C 5/08* (2006.01)
  *F02D 33/00* (2006.01)

(52) U.S. Cl.
  CPC ............ *F02D 41/22* (2013.01); *G07C 5/006* (2013.01); *G07C 5/085* (2013.01); *G07C 5/0808* (2013.01); *F02D 33/006* (2013.01); *F02D 2041/224* (2013.01); *F02D 2200/101* (2013.01); *G07C 5/008* (2013.01); *G07C 5/0816* (2013.01); *Y02T 10/40* (2013.01)

(58) Field of Classification Search
None
See application file for complete search history.

(56) References Cited

U.S. PATENT DOCUMENTS 4,594,669 A * 6/1986 Hosaka ............... F02D 41/2451
                                                   123/480
5,241,933 A * 9/1993 Morikawa ............... F02B 33/30
                                                   123/198 D
(Continued)

FOREIGN PATENT DOCUMENTS

CN          203098052 U      7/2013
CN          205562168 U      9/2016
DE        102012204785 A1    9/2013

OTHER PUBLICATIONS

The office action of the corresponding Taiwanese application dated Dec. 15, 2017.

*Primary Examiner* — Nicholas K Wiltey
(74) *Attorney, Agent, or Firm* — CKC & Partners Co., LLC

(57) ABSTRACT

An alarm system is used for a vehicle including a fuel pump and an engine. The alarm system includes a measuring device, a computing device and a warning device. The measuring device is used to read a current rotation speed of the engine and respectively measures a plurality of running times of a plurality of rotation speed values of the current rotation speed. The computing device calculates a plurality of consuming times of the fuel pump corresponding to the rotation speed values according to the running times of the rotation speed values, respectively. When an accumulating consuming time accumulated by the consuming times reaches a default critical value, the warning device generates a warning message.

8 Claims, 4 Drawing Sheets

(56) References Cited

U.S. PATENT DOCUMENTS

| | | | | |
|---|---|---|---|---|
| 6,871,633 B1* | 3/2005 | Date | F02D 33/006 | 123/445 |
| 6,907,775 B2* | 6/2005 | Hosoya | F02D 41/064 | 73/114.41 |
| 7,228,210 B2* | 6/2007 | Davis | G07C 5/008 | 340/438 |
| 7,886,586 B2 | 2/2011 | Fujino et al. | | |
| 9,233,828 B2* | 1/2016 | Portocalis | B67D 7/08 | |
| 2002/0143447 A1* | 10/2002 | Miller | G07C 5/008 | 701/33.4 |
| 2004/0148088 A1* | 7/2004 | Davis | G07C 5/008 | 701/123 |
| 2005/0125117 A1* | 6/2005 | Breed | G07C 5/008 | 701/31.5 |
| 2007/0286747 A1* | 12/2007 | Nagase | F02D 41/065 | 417/410.1 |
| 2008/0067888 A1* | 3/2008 | Il | F04D 5/002 | 310/245 |
| 2008/0202476 A1* | 8/2008 | Teets | F02D 41/021 | 123/497 |
| 2009/0326756 A1* | 12/2009 | Fletcher | G01M 15/044 | 701/31.4 |
| 2012/0095667 A1* | 4/2012 | Hase | F02D 41/3082 | 701/103 |
| 2012/0291754 A1* | 11/2012 | Yamaguchi | F02D 41/2464 | 123/458 |
| 2013/0289810 A1* | 10/2013 | Holmes | B60K 6/24 | 701/22 |
| 2013/0340721 A1* | 12/2013 | Suda | F02D 41/221 | 123/496 |
| 2015/0130377 A1* | 5/2015 | Hidaka | F04D 5/002 | 318/400.11 |
| 2017/0016401 A1* | 1/2017 | Stockwell | F02C 7/22 | |
| 2017/0197727 A1* | 7/2017 | Kim, II | G06F 16/23 | |

* cited by examiner

ALARM SYSTEM AND ALARM METHOD

RELATED APPLICATIONS

This application claims priority to China Application Serial Number 201611095196.2, filed Dec. 2, 2016, which is herein incorporated by reference.

BACKGROUND

Technical Field

The present disclosure relates to an alarm system. More particularly, the present disclosure relates to an alarm system and an alarm method for a fuel pump of a vehicle.

Description of Related Art

Vehicles are very common transportation in modern life. A vehicle is made of many devices and components. When any device or component malfunctions, the operation of the vehicle will be influenced, causing dangers to the driver and passengers. Accordingly, it is common to monitor an engine, a gearbox and an in-car electronic system of a vehicle with an on-board diagnostics in a real-time basis to avoid sudden emergencies.

However, in the current market, there is no real-time detecting system for the fuel pump of the engine of the vehicle, so the vehicle has to be checked with a fuel pump pressure tester in a car maintenance facility regularly and do preventive maintenance and preventive replacement of the fuel pump. Since there are different types of vehicles, different driving habits of drivers and different road conditions, it hard to effectively judge the time point of maintenance and replacement. Moreover, the fuel pump tester in the car maintenance plant is professional equipment, such that a normal person cannot operate the test at any time. If the fuel pump of the engine malfunctions when driving, the vehicle will may become anchored and further, may cause a car accident.

SUMMARY

For effectively monitoring usage and life of a fuel pump of a vehicle and generating a warning message in time to remind a driver to replace the fuel pump, one aspect of the present disclosure is an alarm system. The alarm system is used for a vehicle, wherein the vehicle comprises a fuel pump and an engine, the alarm system comprises: a measuring device configured to read a current rotation speed of the engine, and respectively measures a plurality of running times of a plurality of rotation speed values of the current rotation speed; a computing device configured to calculate a plurality of consuming times of the fuel pump corresponding to the rotation speed values according to the running times of the rotation speed values, respectively; and a warning device configured to generate a warning message when an accumulating consuming time accumulated by the consuming times reaches a default critical value.

In addition, another aspect of the present disclosure is an alarm method. The alarm method is used for a vehicle, wherein the vehicle comprises a fuel pump and an engine, the alarm method comprises: reading a current rotation speed of the engine, and respectively measures a plurality of running times of a plurality of rotation speed values of the current rotation speed; calculating a plurality of consuming times of the fuel pump corresponding to the rotation speed values according to the running times of the rotation speed values, respectively; and generating a warning message when an accumulating consuming time accumulated by the consuming times reaches a default critical value.

With the alarm system and the alarm method of the present disclosure, the vehicle driver can know in time that the fuel pump is about to arrive the end of its life, so the driver can replace the fuel pump in time to ensure further road safety. In addition, the present disclosure discloses that calculating the life span of the fuel pump according to the rotation speed of the engine of the vehicle, which is different from the traditional method which checks the fuel pump via a pressure tester, so the detecting process is simpler, more convenient and more immediate. Before the alarm system outputs the warning message, the driver has no need to go to a car maintenance facility to check the fuel pump.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. In accordance with the standard practice in the industry, various features are not drawn to scale. In fact, the dimensions of the various features may be arbitrarily increased or reduced for clarity of discussion.

Moreover, terms of "comprise", "include", "have", etc. are open transitional phrases meaning "include but not limited to". In addition, the usage "and/or" in the specification includes any one of the listed items or a combination of the items.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
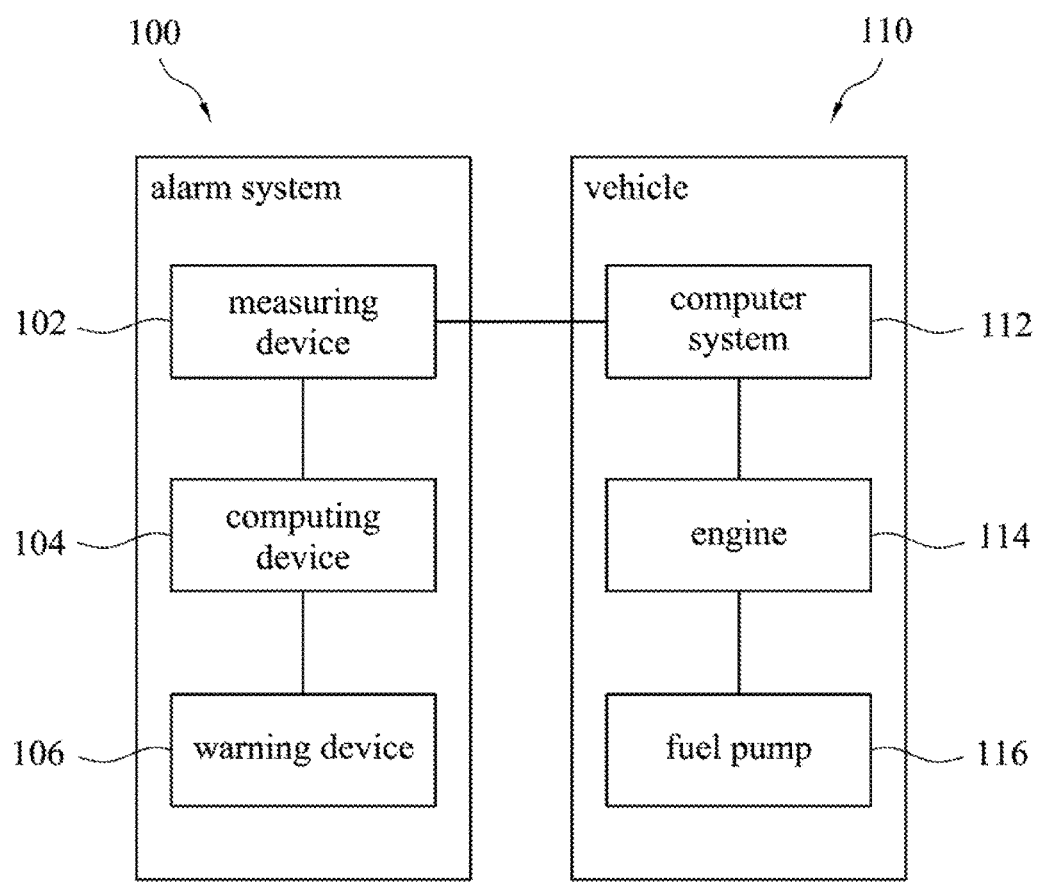
FIG. 1 is an architecture diagram of an alarm system according to an embodiment of this disclosure.

Reference is made to FIG. 1. FIG. 1 depicts an architecture diagram of an alarm system 100 according to an embodiment of this disclosure. In FIG. 1, the alarm system 100 is electrically connected to a vehicle 110. In the embodiment of FIG. 1, the alarm system 100 can be an independent external device, in which the alarm system 100 includes a connector for being connected to the vehicle 110 to facilitate a user to connect the alarm system 100 to a data transmission interface of the vehicle 110 when needed, or to facilitate the user to use the same alarm system 100 on different vehicles.

In another embodiment, the alarm system 100 can be built in the vehicle 110 (not shown) and electrically connected to a computer system 112 of the vehicle 110.

As shown in FIG. 1, the vehicle 110 includes the computer system 112, an engine 114 and a fuel pump 116. The computer system 112 is an embedded system of the vehicle 110, which is used to control operations of the vehicle 110 and monitor every information of the vehicle 110 such as car speed, rotation speed and oil remaining of the engine 114. The fuel pump 116 is used to pump the gasoline into the engine 114 for the engine 114 to operate. The computer system 112 can read a rotation speed of the engine 114. The fuel pump 116 has a predetermined operating life which is usually provided by manufacturers. The fuel pumps with different brands, years or types have different predetermined operating life. When an operating time of the fuel pump 116 is close to or exceeds the predetermined operating life, the possibility of malfunction of the fuel pump 116 increases significantly. Accordingly, the user has to replace the fuel pump 116 in proper time.

The alarm system 100 is used to calculate a consuming time of the fuel pump 116 for outputting a warning message when the fuel pump 116 is close to the predetermined operating life. The alarm system 100 includes a measuring device 102, a computing device 104 and a warning device 106. The measuring device 102 is electrically connected to the computing device 104, and the computing device 104 is electrically connected to the warning device 106.

Specifically, the measuring device 102 is an on-board diagnostics (OBD), for example. The measuring device 102 is electrically connected to the computer system 112 of the vehicle 110 to keep reading a current rotation speed of the engine 114 and respectively measure a plurality of running times of a plurality of rotation speed values of the current rotation speed. For example, if a total running time of the engine 114 being at a rotation speed value A1 (e.g., the rotation speed value A1 is a constant value like 3000 rpm or a range between 2951 rpm-3050 rpm) is P1, and if another total running time of the engine 114 being at a rotation speed value A2 (e.g., the rotation speed value A2 can a constant value like 3100 rpm or a range between 3051 rpm-3150 rpm) is P2, the measuring device 102 will record the rotation speed value A1 and A2 and the corresponding running times P1 and P2. When the vehicle 110 is moving, the current rotation speed of the engine 114 is not a constant value because the car speed varies according to a driver's driving habits and road conditions, so the running time corresponding to each rotation speed value cumulatively changes over time.

In another embodiment, the measuring device 102 can record an average value of the rotation speeds of the engine 114 at every time period. That is, the measuring device 102 can record the rotation speeds of the engine 114 and the corresponding running times according to any rule.

The computing device 104 may be a processor or a system on chip (SoC) and used to calculate the consuming times corresponding to the fuel pump 116 according to the running time corresponding to each rotation speed value of the engine 114. The warning device 106 is a message generating interface such as a display screen, a speaker, a device for transmitting information or the combination thereof. The warning device 106 is controlled by the computing device 104. When an accumulative consuming time accumulates with the consuming times reach a default critical value, the warning device 106 generates a warning message to remind the driver to replace the fuel pump 116. The default critical value is related to the predetermined operating life of the fuel pump 116.

For example, if the predetermined operating life is 5000 hours, the default critical value can be 4500 hours, such that the warning device 106 can output an early warning message before the time the predetermined possibility of malfunction of the fuel pump 116 increases. The default critical value can be provided by the manufacturer or set by the driver, but is not limited thereto. If the warning device 106 is a transmission device, the warning device 106 can transmit the warning message to the car dashboard of the vehicle 110 to show a warning content or flash a warning indicator. If the warning device 106 is a display screen or a speaker, the warning device 106 can display the warning message on the display screen or output a warning sound to war the driver. It should be understood that the warning device 106 is not limited to only outputting text, picture or sound messages, any way that can inform the driver would be a warning mechanism of the warning device 106.

Figure 2:
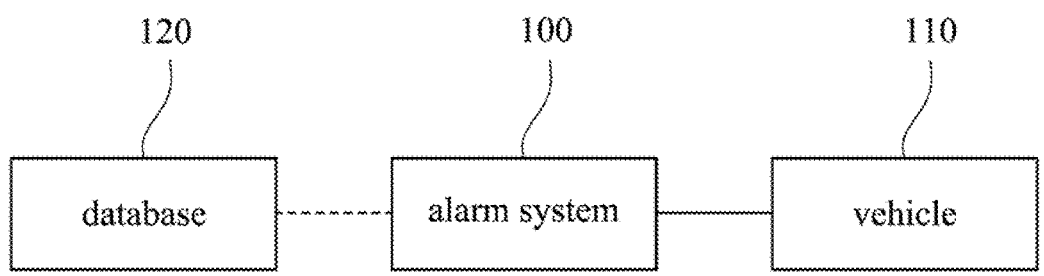
FIG. 2 is an architecture diagram of an alarm system according to an embodiment of this disclosure.

In one embodiment, the alarm system 100 can further be connected to a database, as shown in FIG. 2. In FIG. 2, the alarm system 100 is connected to the database 120 via a wired transmission (e.g., a transmission line) or a wireless transmission (e.g., Wi-Fi or Bluetooth) for writing or reading the data of the database 120. The database 120 is a knowledge base of the vehicle which stores the predetermined operating life information of the vehicle 110 or even stores the predetermined operating life information of every vehicle of every brand and every type. The database 120 can be installed on an online server for the alarm system 100 of every user to access remotely and wirelessly. Or, the database 120 can be built in the alarm system 100 and can be regularly synchronized with an online database manually or automatically.

Figure 3:
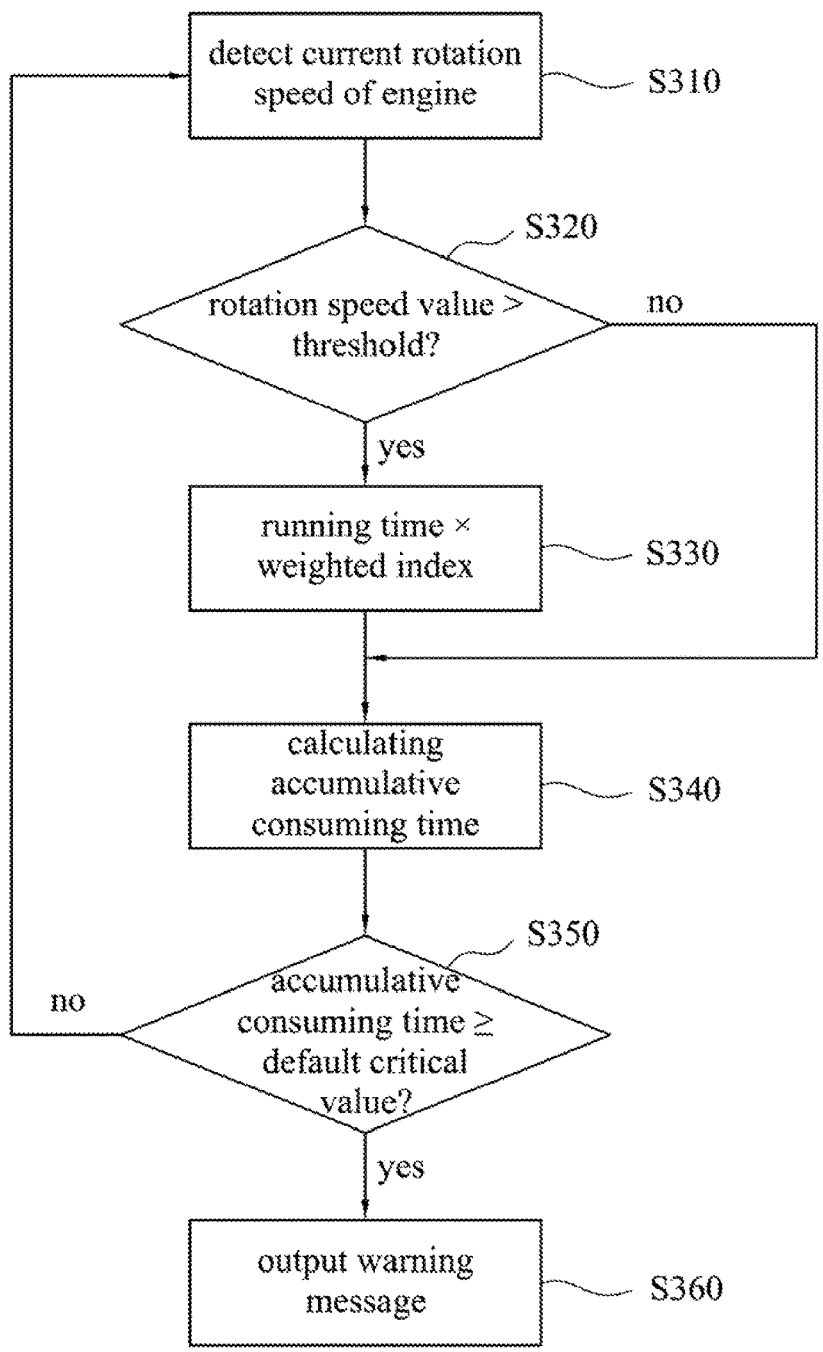
FIG. 3 is a flow chart of an alarm method according to an embodiment of this disclosure.

Detailed warning steps of the alarm system 100 are referred to FIG. 3. FIG. 3 depicts a flow chart of an alarm method 300 according to one embodiment of the present disclosure. The alarm method 300 includes steps S310, S320, S330, S340, S350 and S360. In step S310, the measuring device 102 detects the current rotation speed of the engine 114 in a real-time basis and respectively measures plural running times corresponding to plural rotation speed values of the current rotation speed.

Since the rotation speed of the engine 114 is related to an oil supply pressure of the fuel pump 116, when the rotation speed is higher, an oil supply frequency of the fuel pump 116 is also higher, causing the fuel pump 116 being consumed more and the operating life being consumed more quick. Therefore, in step S320, the computing device 104 determines whether the rotation speed value is higher than a threshold. When the rotation speed value is lower than the threshold, taking the running time corresponding to the rotation speed value as the consuming time of the fuel pump 116. When the rotation speed value is higher than the threshold, the alarm method 300 is directed to step S330 to multiply the running times corresponding to the rotation speed value by a weighted index and then take the running time multiplied by the weighted index as the consuming time of the fuel pump 116. That is, the consumption of life is higher when the rotation speed value is higher than the threshold. The threshold can be set according to the quality of the engine 110, and the weighted index is positive related to rotation speed.

For example, presuming the threshold is 3000 rpm. When the vehicle 110 is moving with a constant 3000 rpm rotation speed, the running time of the rotation speed is the consuming time of the fuel pump 116. And the vehicle 110 accelerates to 4500 rpm at a certain time point and maintains 4500 rpm rotation speed for 0.5 seconds and then decelerates back to 3000 rpm. Presuming that the vehicle 110 experiences three rotation speed phases 3500 rpm, 4000 rpm and 4500 rpm when accelerating to 4500 rpm from 3000 rpm, and every phase lasts 0.5 seconds, i.e., total time is 1.5 seconds. Since 3500 rpm, 4000 rpm and 4500 rpm are higher than the threshold 3000 rpm, calculating the consuming time according to the following equation (1):

$$Tb = Ta \times \{1+(RPM-Th)/Th\} \qquad \text{equation (1)}$$

Tb is the consuming time; Ta is the original running time corresponding to each rotation speed value; RPM represents the rotation speed value; Th represents the threshold (3000); and $\{1+(RPM-Th)/Th\}$ is the weighted index.

According to equation (1), when the engine 114 of the vehicle 110 is at 3500 rpm, 4000 rpm and 4500 rpm, the total consuming time is:

$$Tb = 0.5 \times \{1+(3500-3000)/3000\} + \\ 0.5 \times \{1+(4000-3000)/3000\} + 0.5 \times \{1+(4500-3000)/3000\} = 2$$

That is, the consuming time of the accelerating period is 2 seconds which is increased by 33% relative to the real running time 1.5. It should be noted that the above equation (1) is just one example of the present disclosure. The weighted index can be adjusted non-linearly according to the rotation speed and the threshold is not limited to one single value. Moreover, every threshold can correspond to different weighted indexes, the present disclosure is not limited in this regard.

In one embodiment, if the rotation speed value is recorded in a value range basis, the parameter RPM of the equation (1) is the mean value of the value range. For example, presuming the current rotation speed is within a value range 2951 rpm-3050 rpm, the mean value 3000 rpm of the value range 2951 rpm-3050 rpm would be the parameter RPM in equation (1).

Next, in step S340, calculating the accumulative consuming time, and in step S350, determining whether the accumulative consuming time reaches (is higher than or equivalent to) the default critical value. In this embodiment, the predetermined operating life of the fuel pump 116 is 5000 hours, and the default critical value is 4500. When in step S350, the accumulative consuming time reaches the default critical value, the alarm method 300 proceeds to operate step S360 to make the warning device 106 output the warning message. When the driver receives the warning message and replaces the fuel pump 116, the consuming time accumulation will restart. If step S350 determines that the accumulative consuming time still does not reach the default critical value, repeating steps S310-S350 to continue to accumulate the consuming time.

Figure 4:
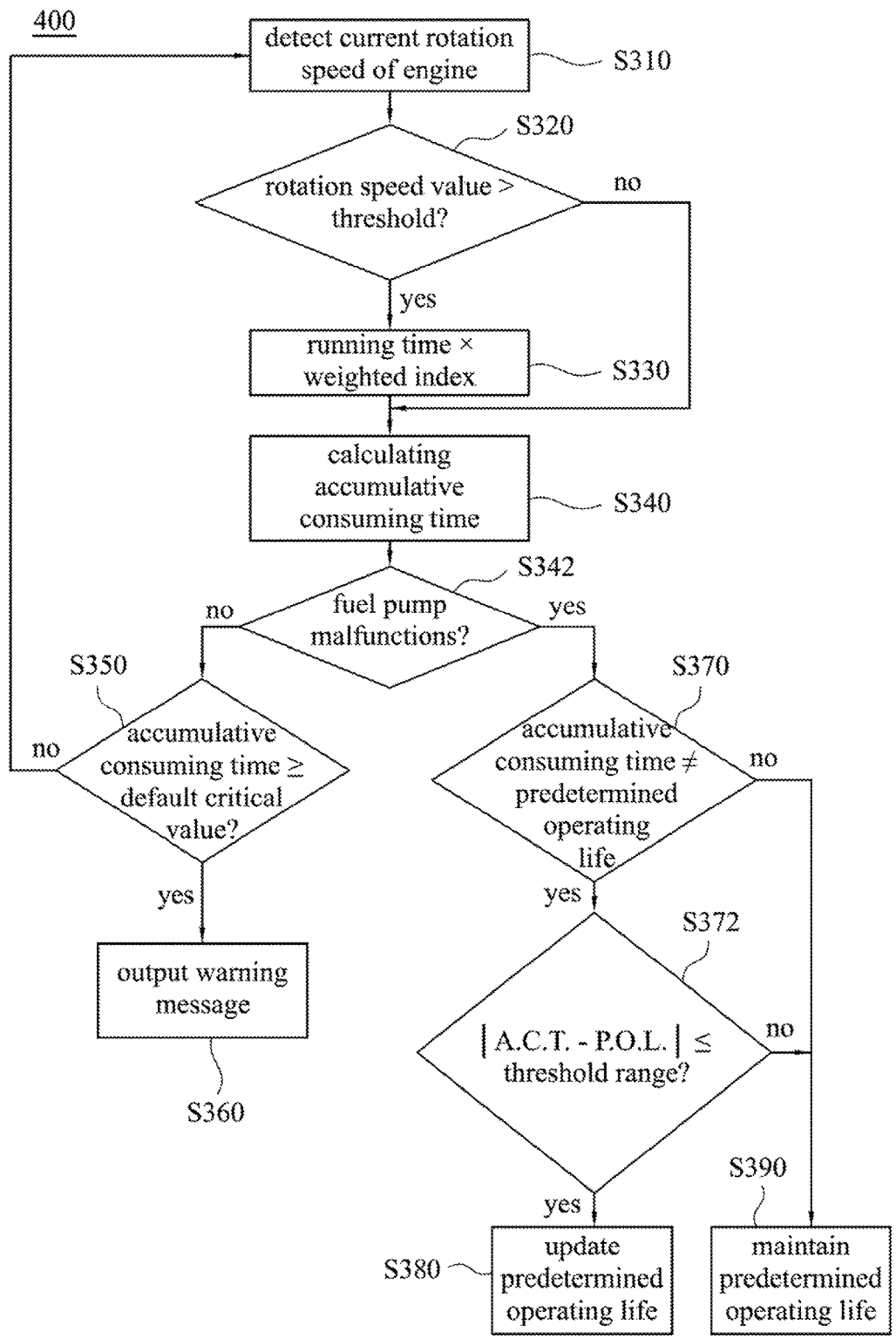
FIG. 4 is a flow chart of an alarm method according to an embodiment of this disclosure.

In another embodiment of the present disclosure, the predetermined operating life can be updated. Reference is made to FIG. 4. FIG. 4 depicts a flow chart of an alarm method 400 according to one embodiment of the present disclosure. The alarm method 400 includes steps S310, S320, S330, S340, S350 and S360 of the alarm method 300. In addition, the alarm method 400 further includes steps S342, S370, S372, S380 and S390p. in steps S310-S340, the alarm system 100 detects the current rotation speed of the engine 114 in a real-time basis, respectively measures plural running times according to plural the rotation speed values of the current rotation speed, and calculates the consuming time corresponding to each rotation speed value and the totally accumulative consuming time. Then, the alarm method 400 proceeds to step S342 to determine whether the fuel pump 116 malfunctions. If no malfunction is found in step S342, the alarm method 400 is directed to step S350 to further determine whether the accumulative consuming time of the fuel pump 116 exceeds the default critical value. When the accumulative consuming time exceeds the default critical value, warning is then made in step S360.

If a malfunction of the fuel pump 116 of the vehicle 110 is found in step S342, the alarm method 400 is directed to step S370. In step S370, determining whether the accumulative consuming time of the fuel pump 116 at the time malfunction happened is equivalent to the predetermined operating life. Generally speaking, if the driver continues driving the vehicle 110 without replacing the fuel pump 116 after the warning system 106 outputs the warning message, the fuel pump 116 will malfunction at the time around the predetermined operating life. The accumulative consuming time of the fuel pump 116 at the time the malfunction happened is theoretically equivalent to the predetermined operating life. However, since the predetermined operating life is just a predicted reference value provided by the manufacturer, there would exist a deviation from a real malfunction time point of the fuel pump 116. Moreover, the malfunction time point would be different according to differences in the manufacturing procedure of the fuel pump 116, uneven qualities of components, or differences of a driver's habits. Therefore, the accumulative consuming time of the fuel pump 116 at the malfunction time point is not necessary equivalent to the predetermined operating life. That is, the fuel pump 116 may malfunction at a time point other the predetermined operating life.

The fuel pump 116 may malfunction before reaching the predetermined operating life, or keep operating for a while after reaching the predetermined operating life, resulting in the real malfunction time point exceeds the predetermined operating life. An unexpected malfunction happened at the time point other than the predetermined operating life cannot be predicted by any alarm system, so taking the accumulative consuming time of the fuel pump 116 when the unexpected malfunction happened as a reference value and further deciding whether to update the predetermined operating life to a new predetermined operating life for providing subsequent references to the alarm system 100 of the vehicle 110 or of any other vehicle of same type after the fuel pump 116 is repaired or replaced.

In addition, if a difference between the accumulative consuming time at the malfunction time point and the predetermined operating life is too large, the malfunction could be just a special or single case and has little reference value. For example, the fuel pump could be damaged due to a car accident or manually improper removal and modification, which would cause the difference between the accumulative consuming time at the malfunction time point and the predetermined operating life to become too large. Therefore, when step S370 determines that the accumulative consuming time of the fuel pump 116 at the malfunction time point is different to the predetermined operating life, the alarm method 400 further proceeds step S372 to determine whether the difference between the accumulative consuming time and the predetermined operating life is within a threshold range (i.e., whether |accumulative consuming time−predetermined operating life|≤threshold range). The difference between the accumulative consuming time and the predetermined operating life is that the accumulative consuming time minus the predetermined operating life and then taking an absolute value of the result.

When the difference is within the threshold range (e.g., 200 hours), it represents that the accumulative consuming time at the malfunction time point has a certain reference value, so proceeding to step S380 to update the predetermined operating life to the new predetermined operating life. For example, taking an average value of the accumulative consuming time of the fuel pump calculated by the database 120 and the predetermined operating life to update the predetermined operating life to the new predetermined operating life. When the difference exceeds the threshold range, it represents that the accumulative consuming time at the malfunction time point has no reference value, the alarm method 400 proceeds to step S390 to maintain the predetermined operating life.

In one embodiment, in the above steps of updating the predetermined operating life to the new predetermined operating life, it is not limited to taking the average value of the accumulative consuming time and the predetermined operating life as the new predetermined operating life. In practical application, the new predetermined operating life can be generated according to any equations which use the accumulative consuming time and the predetermined operating life as the parameters. Updating the predetermined operating life based on the real malfunction time point, the life of the fuel pump 116 can be closer to a real condition.

After updating the predetermined operating life to the new predetermined operating life, if the database 120 is a built-in database of the alarm system 100, the alarm system 100 can read the new predetermined operating life and take the new predetermined operating life as subsequent references. If the database 120 is installed in an online server, the predetermined operating life can be updated via connecting to internet to obtain a life data of the fuel pump 116 which is closest to the reality at any times.

In another embodiment, if step S370 determines that the real malfunction time point of the fuel pump 116 is equivalent to the predetermined operating life, there is no need to update the predetermined operating life, and the alarm method 400 proceeds to step S390 to maintain the predetermined operating life.

With the disclosure of the above-mentioned alarm system 100 and alarm methods 300 and 400 of the present disclosure, the fuel pump can be monitored in a real-time basis to ensure driving security. In addition, when the fuel pump malfunctions unexpectedly, the alarm system can dynamically update the predetermined operating life of the fuel pump, such that the determining and alarming mechanism of the alarm system can be more precise.

What is claimed is:

1. An alarm system for a vehicle, wherein the vehicle comprises a fuel pump and an engine, the alarm system comprises:
    a measuring device configured to read and obtain a plurality of rotation speed values of the engine in a real-time basis, and respectively measure a plurality of running times respectively corresponding to the rotation speed values;
    a computing device configured to calculate a plurality of consuming times of the fuel pump corresponding to the rotation speed values according to the running times of the rotation speed values, respectively, wherein when one of the rotation speed values reaches a threshold, the computing device multiplies one of the running times corresponding to the one of the rotation speed values by a weighted index and then takes the one of the running times multiplied by the weighted index as one of the consuming times of the fuel pump, wherein the weighted index is positively related to the one of the rotation speed values; and
    a warning device configured to generate a warning message when an accumulating consuming time accumulated by the consuming times reaches a default critical value.

2. The alarm system according to claim 1, wherein when another one of the rotation speed values does not reach the threshold, the computing device takes another one of the running times corresponding to the another one of the rotation speed values as another one of the consuming times of the fuel pump corresponding to the another one of the rotation speed values.

3. The alarm system according to claim 1, wherein the default critical value is related to a predetermined operating life of the fuel pump.

4. The alarm system according to claim 1, further comprises:
    a database configured to store a predetermined operating life of the fuel pump;
    when the fuel pump malfunctions at a time point other the predetermined operating life, the database determines whether to update the predetermined operating life to a new predetermined operating life according to the accumulating consuming time of the fuel pump at the time point of malfunction.

5. The alarm system according to claim 4, wherein the database further calculates a difference between the accumulating consuming time and the predetermined operating life, when the difference is within a threshold range, the database calculates an average value of the accumulating consuming time and the predetermined operating life of the fuel pump and uses the average value to update the predetermined operating life to the new predetermined operating life, and when the difference exceeds the threshold range, the database maintains the predetermined operating life.

6. An alarm method for a vehicle, wherein the vehicle comprises a fuel pump and an engine, the alarm method comprises:
    reading and obtaining a plurality of rotation speed values of the engine in a real-time basis, and respectively measuring a plurality of running times respectively corresponding to the rotation speed values;
    calculating a plurality of consuming times of the fuel pump corresponding to the rotation speed values according to the running times of the rotation speed values, respectively;
    when one of the rotation speed values reaches a threshold, multiplying one of the running times corresponding to the one of the rotation speed values by a weighted index and then taking the one of the running times multiplied by the weighted index as one of the consuming times of the fuel pump, wherein the weighted index is positively related to the one of the rotation speed values; and
    generating a warning message when an accumulating consuming time accumulated by the consuming times reaches a default critical value.

7. The alarm method according to claim 6, wherein the default critical value is related to a predetermined operating life of the fuel pump.

8. The alarm method according to claim 6, wherein the fuel pump has a predetermined operating life, when the fuel pump malfunctions at a time point other the predetermined operating life, the alarm method further comprises:

calculating an average value of the accumulating consuming time at the time point and the predetermined operating life of the fuel pump and using the average value to update the predetermined operating life to a new predetermined operating life.

\* \* \* \* \*